Figure 1:
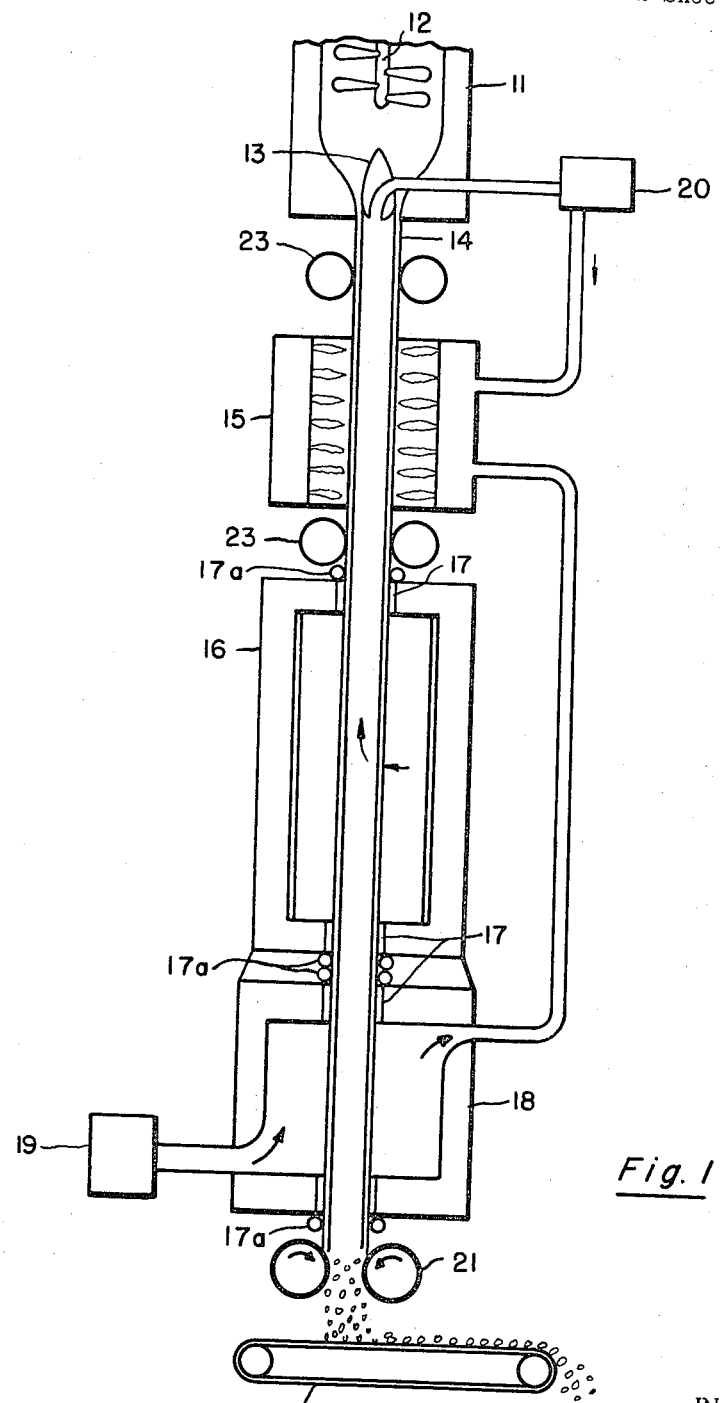

INVENTOR.
JOHN C. McMULLEN

United States Patent Office 3,375,073
Patented Mar. 26, 1968

3,375,073
PROCESS AND APPARATUS FOR EFFECTING
SOLID-STATE REACTIONS
John C. McMullen, Niagara Falls, N.Y., assignor to The
Carborundum Company, Niagara Falls, N.Y., a corporation of Delaware
Filed Nov. 14, 1960, Ser. No. 68,855
12 Claims. (Cl. 23—204)

This invention relates to an apparatus and process for effecting solid-state chemical reactions, and more particularly relates to an apparatus and process for the continuous production of carbides, borides and the like.

The principal commercial method now employed in the manufacture of solid-state inorganic compounds, such as carbides, borides and the like, is a batch operation wherein a mixture of ingredients is interacted in a very high temperature electric furnace. For example, in the manufacture of silicon carbide, a mixture of sand and coke is reacted in an Acheson-type, electric resistance furnace at a core temperature in the range of about 2000° C. to about 2600° C. The total processing time is about 80 to 120 hours, including about 36 hours heating and reaction time and up to about 90 hours cooling time. A typical furnace yields about 9 to 12 tons of silicon carbide crystals per run. However, only 60 to 70% of the mix is converted, the material at the greatest distance from the core remaining unreacted and the material close to the core being thermally converted to artificial graphite. Furthermore, the energy efficiency is only about 70%.

While this process has been utilized heretofore as the best available for commercial operations, it nevertheless has a number of disadvantages. Thus it is slow and consequently time-consuming, requiring careful attendance by furnace operators throughout the heating and reaction period. Also, it is relatively inefficient, as indicated above.

In contrast, the advantages of a continuous process are well known. They include greater economy, increased power efficiency, and increased utilization of energy by the collection and recycling of gaseous by-products. Also, the handling of "old mix," as required in the Acheson process, is obviated. However, several continuous processes have been suggested for effecting solid-state chemical reactions, such as production of silicon carbide, but none have been commercially successful. One of the principal difficulties has been wear on furnace parts, such as batch containers and the like, arising from the movement of the charge therethrough. Another difficulty has been the contamination of the finished product by impurities as a result of contact between furnace parts such as batch containers and the like, and the charge.

My invention provides a continuous process for making carbides which eliminates these difficulties. The reactants never come into contact with the furnace walls or any type of batch container during the reaction. Thus, there can be no furnace erosion; nor can any impurities be introduced into the finished product as a result of such erosion. Furthermore, practically all of the raw materials are reacted and by-products are efficiently utilized and recycled.

Accordingly, it is an important object of the present invention to provide a continuous process of high efficiency and greater economy for effecting solid-state chemical reactions.

Another object is to provide a continuous process for producing silicon carbide from silicon dioxide and carbon.

Still another object is to provide an apparatus for the continuous production of solid-state inorganic compounds, such as carbides, borides, and the like.

Essentially, in the preparation of silicon carbide, my process comprises preparing a raw batch composed of silicon dioxide and carbon, extruding the batch to form a vertically self-supporting shape, such as a tube, passing the shape at a constant and controlled rate through a furnace maintained at an appropriate reaction temperature, and cooling and recovering the finished product.

In the drawings, I have illustrated diagrammatically two forms of apparatus which are adapted to be utilized in carrying out my process.

Figure 2:
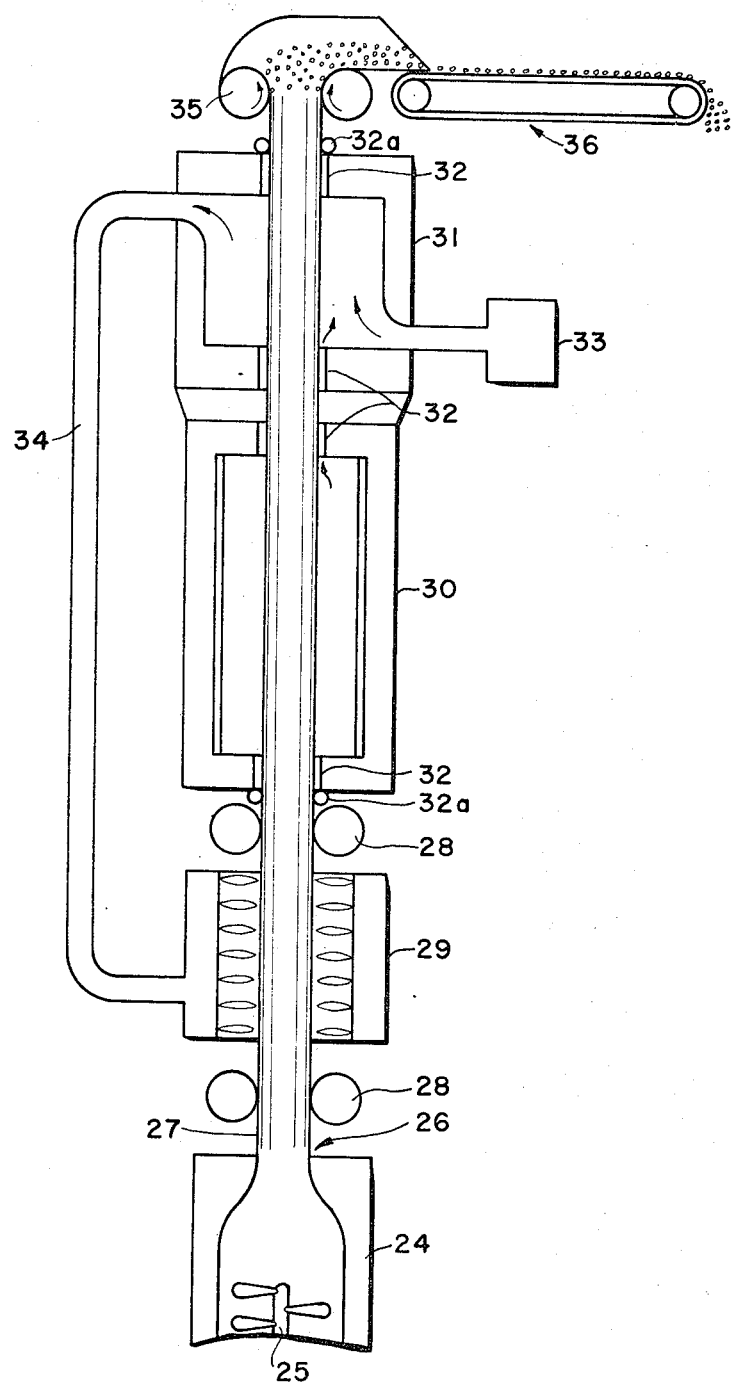

FIG. 1 is a diagrammatic illustration of one form of apparatus wherein the extruded shape for reaction is moved downwardly; and FIG. 2 is a diagrammatic illustration of apparatus wherein the extruded shape is moved upwardly for reaction.

In performing my process, as for example in the production of silcon carbide, a raw batch is prepared in appropriate mixing apparatus such as a pug mill. The principal ingredients of the batch comprise silicon dioxide and carbon. A small amount of a temporary, thermally-decomposable binder, such as corn syrup, is added to the principal ingredients and admixed therewith, and generally the batch is dampened by the addition of water. The batch is carefully milled until a thorough admixture of the ingredients is provided.

Now, with reference to FIG. 1 of the drawing, it will be seen that the thoroughly admixed batch is fed into an extruder 11 having a pressure screw 12 therein, which upon rotation is effective to force the batch from the extruder and around a die 13. The die shown is of cone-like shape; consequently the batch in being forced past the die is formed into an extruded, continuous tube 14. The tube 14 moves vertically downwardly between upper and lower synchronized guide rolls 23, through a dryer 15. In the dryer, carbon monoxide recovered from another zone of the process, is burned in admixture with air to generate heat, which is effective to remove moisture from the tube, preheat it below reaction temperature, and convert it into a rigid, self-supporting structure.

From the dryer, the tube 14 moves downwardly through the lower synchronized guide rolls 23, and into and through a furnace 16. The furnace illustrated is of tubular configuration, being closed at the ends except for coaxially aligned, circular apertures 17. The furnace is maintained at an appropriate reaction temperature, discussed below, and may be heated either by electrical induction or resistance methods, or by other suitable means. At the upper aperture 17, the space between the wall of the aperture and the tube 14 is provided with a sliding seal by means of a heat-resistant packing 17a, such as refractory fiber. Also, at the lower aperture 17, the space between the walls of the aperture and the tube 14 is provided with a sliding seal by means of a heat-resistant packing 17a. During the reaction of the silicon dioxide and the carbon, effluent carbon monoxide is produced within the furnace and is prevented from escaping by means of the aforementioned seals. Also, because the furnace is sealed, a non-oxidizing atmosphere of carbon monoxide is maintained therein. Inasmuch as the reacted tube is porous, the effluent carbon monoxide passes into the interior of the tube and is drawn upwardly, as indicated by the arrow, by a pump 20, at a rate commensurate with the rate of carbon monoxide formation, so that little if any air is drawn in at the bottom, exposed end of the tube 14. While not shown, to avoid complicating the drawing, it may be desirable to enclose the lower end of the apparatus in an air-tight box with an air lock for removing the product. Thus air can be prevented from entering the interior of the tube 14 at its lower end.

From the furnace 16, the reacted tube is moved downwardly through a cooler 18, which is of any appropriate shape, that illustrated being suitably cylindrical, like the furnace 16. The cooler is also sealed as at 17a. A blower 19 is connected by a suitable conduit to the lower end of the cooler 18 and is effective to supply atmospheric air to the interior of the cooler in ambient, cooling relationship to the reacted tube 14, at this point converted to silicon carbide, to reduce the temperature of the carbide to a point where it can be handled. The air employed in cooling the reacted tube is, of course, heated. This heated air is exhausted from the upper end of the cooler through a conduit leading to the dryer 15. At dryer 15, the air from cooler 18 and the carbon monoxide produced by the reaction in furnace 16, are admixed and burned as previously mentioned.

From the cooler 18, the cooled tube 14 of silicon carbide passes downwardly between a pair of crusher rolls 21 which break the silicon carbide into lumps. The lumps drop onto a conveyor belt 22 for transport to further operations.

It should be noted that the dryer 15, the furnace 16, and the cooler 18 are heavily insulated to minimize heat losses and thereby maintain optimum energy utilization.

While the invention has been described in terms of extruding a tube, it is to be considered within the scope of the disclosure to extrude other shapes, such as rods of circular or other section and with either smooth or fluted surfaces, such latter surfaces also being applicable to tubes. Sheet extrusions, including ribbons are also to be included within the scope of the invention.

Referring again to the drawings, FIG. 2 illustrates schematically an apparatus adapted to the production of solid shapes as contrasted to the hollow shapes made by the apparatus of FIG. 1. Also by the apparatus of FIG. 2, the extruded shape can be moved upwardly instead of downwardly as in FIG. 1.

As shown in FIG. 2, a thoroughly admixed batch is placed in an extruder 24 having a pressure screw 25 therein, which upon rotation is effective to force the batch through a suitable opening 26 in the extruder and form a solid shape corresponding to the configuration of the opening. As illustrated in FIG. 2, the opening 26 is circular so that a rod 27 is formed. The rod is moved upwardly between synchronized guide rolls 28, and through a dryer 29. In the dryer, recycled carbon monoxide and air in admixture are burned to dry the rod, preheat it, and convert it to a rigid, self-supporting structure.

From the dryer 29, the rod 27 moves upwardly through the upper synchronized rolls 28, and into and through a furnace 30 and a cooler 31. The furnace and cooler are provided with aligned apertures 32 and their interiors are interconnected by means of such apertures at their adjoining walls. The furnace is heated by electrical induction or resistance as described for the apparatus of FIG. 1.

The lower aperture of the furnace and the upper aperture of the cooler are sealed by heat resistant packings 32a which contact the rod 27 as it passes therethrough. In this embodiment, the effluent carbon monoxide passes upwardly around the rod 27, into the cooler 31. A blower 33 is connected by a suitable conduit to the lower end of the cooler and supplies atmospheric air to the interior of the cooler in ambient, cooling relationship to the reacted rod 27, to reduce the temperature to a point where the rod can be handled. The air employed in cooling the reacted rod is heated and admixed with the effluent carbon monoxide from the furnace 30 and recycled via line 34 to dryer 29 where the mixture is burned to produce heat.

From the cooler 31 the rod 27 passes upwardly between crusher rolls 35 which break the rod into lumps, that move onto a conveyor 36 for transportation to further operations.

The present invention is applicable to the manufacture of a number of solid-state inorganic compounds, which include carbides, borides, and the like. The carbides include silicon carbide, zirconium carbide, titanium carbide, aluminum carbide, chromium carbide, beryllium carbide, calcium carbide, columbium carbide, vanadium carbide, molybdenum carbide, hafnium carbide, tantalum carbide, tungsten carbide, thorium carbide and uranium carbide. The borides include those of titanium, zirconium, vanadium, niobium, tantalum, chromium, molybdenum and tungsten.

The following examples illustrate the applicability of the present invention to the production of silicon carbide.

EXAMPLE I

A mixture consisting of finely divided silicon dioxide and carbon was prepared which contained the following ingredients:

|   | Percent |
| --- | --- |
| Jasper flint (99.85% $SiO_2$, 280 mesh and finer) | 46.3 |
| No. 38 Acheson graphite (99.80% C., 400 mesh and finer) | 23.2 |
| Corn syrup (pure) | 26 |
| $H_2O$ | 4.5 |

After careful mixing, the batch was extruded into a ¾" x 32" rod and dried at 200° C. for one hour. Thereafter the rod was hung in a furnace at 1600° C. for one hour. Chemical analysis of the product was as follows:

|   | Percent |
| --- | --- |
| Ignition loss | 10.10 |
| $SiO_2$ | 10.65 |
| Fe | .08 |
| Al | .18 |
| SiC | 76.10 |
| CaO | Trace |
| Surface silicon | .04 |

EXAMPLE II

A run was made wherein finely divided silicon dioxide and carbon were admixed as follows:

|   | Percent |
| --- | --- |
| Jasper flint (99.85% $SiO_2$, 280 mesh and finer) | 46.3 |
| Graphite (ball milled electrode 99.8% C., 400 mesh and finer) | 23.2 |
| Corn syrup (pure) | 26 |
| $H_2O$ | 4.5 |

After careful mixing, the batch was extruded into a 2" O.D. x 1" I.D. x ½" wall tube, 144" long which was dried at 200° C. for one hour. Thereafter the tube was suspended over a vertical furnace 30" high, having a 4" I.D. and heated to 1650° C. The rod was fed downwardly through the furnace at a rate of 30" per hour during a total movement time of 4.06 hours. At the bottom of the furnace, 12" sections of the silicon carbide product were sawed off periodically. Chemical analysis of the product was as follows:

|   | Percent |
| --- | --- |
| $SiO_2$ | 3.02 |
| SiC | 76.66 |
| Free C | 10.73 |

EXAMPLE III

A run was made wherein finely divided silicon dioxide and carbon were admixed in stoichiometric proportions for the formation of silicon carbide in accordance with the following equation:

$$SiO_2 + 3C \rightarrow SiC + 2CO\uparrow$$

The mixture contained the following ingredients:

Jasper flint, 99.85% $SiO_2$, 280 mesh and finer
No. 38 Acheson graphite, 99.80% C, 400 mesh and finer The silicon dioxide and carbon were admixed dry with 3% of dextrin as a temporary binder. Sufficient water (in the range from 12 to 28%) was added to form a mixture suitable for pressing into 1" x 1" cylinder at 1000 p.s.i. After drying for 12 hours at 100° C. the pieces were fired in a graphite tube furnace at a heating rate of 500° C. per hour to a desired final temperature of 1700° C., which was maintained for one hour. Argon was used to maintain a neutral atmosphere. The product had the following chemical analysis:

| | Percent by weight |
|---|---|
| Total C | 32.58 |
| Total Si | 64.45 |
| $SiO_2$ | 3.02 |
| $O_2$ | 2.02 |
| Loss on ignition | 5.16 |
| SiC | 91.74 |
| Total [1] | 99.92 |

[1] $SiC + SiO_2 + L.O.I.$ (C) only.

The following examples illustrate the application of the present invention to the production of zirconium boride, zirconium carbide and titanium carbide.

EXAMPLE IV

A series of runs was made wherein zirconium boride was formed. The mixture contained the following ingredients:

| | Percent |
|---|---|
| $ZrO_2$ (98.9% pure; 325 mesh and finer) | 73.0 |
| $B_4C$ (96.0% pure; 280 mesh and finer) | 16.3 |
| C (99.8% pure; average size, 20 microns) | 10.7 |

In forming the mixture into pressed pieces, 3% of dextrin and water sufficient to dampen were added. In making ¾" extruded rods, pure corn syrup diluted with 15% water was added until the mixture was plastic. The pressed pieces were dried at 100° C. for 8 hours and the extruded pieces at 180° C. for 8 hours. In firing, a graphite resistance furnace was employed, the pressed pieces being set on a support and the extruded pieces were hung. The pieces were held at temperature for one hour. Firing was effected at differing temperatures, the optimum temperature being 1700° C. as shown in the following table.

| Temp., ° C. | Percent | | | | |
|---|---|---|---|---|---|
| | Zr | B | C | $B_2O_3$ | Total |
| 1,600 | 77.49 | 16.03 | 1.50 | .07 | 95.09 |
| 1,700 | 79.45 | 16.34 | 0.76 | .04 | 96.59 |
| 1,800 | 80.16 | 16.49 | 0.60 | .07 | 97.32 |

The material made at optimum temperature of 1700° C., on the basis of chemical analysis, was calculated to be composed of

| | Percent |
|---|---|
| $ZrB_2$ | 67.33 |
| ZrB | 28.32 |
| Total borides | 95.65 |

The borides in the product had a particle size of 15 microns maximum; 0.9 micron minimum; and 4–7 microns average.

EXAMPLE V

A series of runs was made wherein zirconium carbide was formed. The mixture contained the following ingredients:

| | Percent |
|---|---|
| $ZrO_2$ (99+% pure powder) | 77.3 |
| C (99.8% pure; average size, 20 microns) | 22.7 |

The forming, drying and firing steps were effected as described in Example IV. Results of firing at different temperatures are shown in the following table:

| Temp., ° C. | Percent | | |
|---|---|---|---|
| | Zr | C | Total |
| 1,600 | 66.25 | 19.87 | 86.12 |
| 1,700 | 76.89 | 15.47 | 92.36 |
| 1,800 | 84.58 | 13.97 | 98.55 |
| 1,900 | 84.57 | 13.59 | 98.06 |
| 2,000 | 84.16 | 13.73 | 97.89 |

The optimum temperature of operation was 1800° C. and the material made at that temperature was calculated to be composed of:

| | Percent |
|---|---|
| ZrC | 95.73 |
| Graphite | 2.82 |

The zirconium carbide in the product had a particle size of 50 microns maximum; 2.0 microns minimum, and 7–4 microns average.

EXAMPLE VI

A series of runs was made wherein titanium carbide was formed. The mix contained the following ingredients:

| | Percent |
|---|---|
| $TiO_2$ (98.2% pure; 325 mesh and finer) | 69.0 |
| C (99.8% pure; average size, 20 microns) | 31.0 |

The forming, drying and firing steps were effected as described in Example IV. Results of firing at different temperatures are shown in the following table:

| Temp., ° C. | Percent | | |
|---|---|---|---|
| | Ti | C | Total |
| 1,500 | 64.88 | 21.15 | 86.03 |
| 1,600 | 76.75 | 18.09 | 94.84 |
| 1,700 | 77.00 | 17.52 | 94.52 |
| 1,800 | 77.00 | 16.95 | 93.95 |

The optimum temperature of operation was 1800° C. and the material made at that temperature was calculated to be composed of

| | Percent |
|---|---|
| TiC | 84.75 |
| Ti | 9.20 |

The titanium carbide in the product had a particle size of 32 microns maximum; 3.0 microns minimum; and 12–18 microns average.

Reaction temperatures in my process for SiC, fall into the broad range from about 1600° C. to about 1800° C. Preferably temperatures in the range from about 1650° C. to about 1750° C. are employed. Extremely high temperatures are preferably avoided since some graphite formation takes place when carbon is heated with silica to a temperature between the melting point and the boiling point of the silica. Also silica volatilizes at an excessive rate at temperatures about 1800° C., and condenses and plugs the system in cooler portions thereof.

In preparing other carbides and borides, temperatures in the range from about 1500 to about 2000° C. can be employed.

Reaction times applicable to use in this invention fall in the range of about one to about three hours per 1" of thickness depending upon the reaction temperature.

Binders applicable to use in the present invention include dextrin, cellulose, methyl cellulose, tar, pitch, and the like as well as mixtures thereof. Binders, depending upon which one is employed, will be utilized in a general range of up to about 10% by weight, based upon the weight of the batch. The amount of binder used preferably will be kept low and as a general rule will fall into the range of up to about 5% by weight of the batch. In the case of normally solid, but thermoplastic binders such as tar, pitch and the like, it will be necessary to maintain the batch at temperatures where the binder is sufficiently pliable or fluid so that the batch may be extruded.

As mentioned hereinbefore, water can be utilized to moisten the batch and render it extrudable. The amount of water can be determined quite readily by observing the batch as increments are added thereto. Inasmuch as the water is removed in an early stage of the process, i.e., in the dryer, it is not a critical item, except that the amount should be kept at a level whereat the extruded shape will be substantially self-supporting between the exit from the extruder and the entrance of the dryer.

It is to be considered within the scope of the present invention to deviate from stoichiometric proportions of reactants, although most desirable production and economies are effected by utilizing such proportions.

The advantages of the present invention have been alluded to above, but will be reiterated here to vividly highlight the inventive concept. Thus the present invention provides a highly efficient, continuous process for effecting solid-state chemical reactions, such as the production of carbides, borides, and the like. It will be obvious that improved production economies are provided by the present invention because processing from extrusion of the batch to recovery of the finished product can be entirely mechanized and instrumented. Further, increased power efficiency and energy utilization are provided by recycling of heated effluent products and insulation of the apparatus. Still further, since the charge is freely suspended, out of contact with any part of the furnace, it will be obvious that no erosion of the furnace or parts thereof will be effected by the abrasive character of the charge and consequently no impurities will be imparted to the finished product from the furnace. Other advantages are also believed to be apparent to one skilled in the art. Particularly, since the reaction in accordance with the present invention is effected at relatively low temperatures, as compared to prior processes, apparatus life will be greatly extended.

While the present invention has been described in connection with the preferred embodiments thereof, it is subject to reasonable modifications as will become apparent to those skilled in the art and such modifications are to be included within the scope of the invention as defined by the appended claims.

I claim:

1. A continuous process for producing a non-oxidic refractory material of the group consisting of carbides and borides which includes the steps of providing an extrudable mixture containing finely divided materials which are thermally reactive to form said refractory materials; continuously extruding said mixture vertically to form a continuous, reinforced, elongated shape; moving said continuous shape vertically while progressively drying it to render it self-supporting; continuing vertical movement of said dried, continuous, self-supporting shape while progressively heating it without any separate support in a neutral atmosphere to such temperature as to effect reaction of the materials in said shape to form said refractory material without loss of said shape; progressively cooling said continuous shape; and recovering the reaction products therefrom.

2. A process as set forth in claim 1 in which said extrudable mixture is essentially composed of a compound of a carbide-forming metal, carbon, a temporary binder, and water.

3. A process as set forth in claim 1 in which said extrudable mixture is essentially composed of silicon dioxide, carbon, a temporary binder, and water.

4. A process as set forth in claim 3 in which said continuous shape is heated to a temperature in the range from about 1600° C. to about 1800° C. to effect said reaction.

5. A process as set forth in claim 4 in which said silicon dioxide and carbon are employed in approximately the stoichiometric proportions required for the production of silicon carbide.

6. A process as set forth in claim 3 in which said extrudable mixture contains: silicon dioxide 46.3% by weight, carbon 23.2% by weight, corn syrup 26% by weight, and water 4.5% by weight, said mixture is extruded in the shape of a continuous rod of about ¾" diameter, said rod is progressively dried at about 200° C., and said rod is thereafter progressively heated at about 1600° C. to effect the formation of silicon carbide.

7. A process as set forth in claim 3 in which said extrudable mixture contains: silicon dioxide 46.3% by weight, carbon 23.2% by weight, corn syrup 26% by weight, and water 4.5% by weight, said mixture is extruded in the shape of a continuous tube having an outside diameter of approximately 2" and a wall thickness of about ½", said tube is progressively dried at about 200° C., and said tube is thereafter progressively heated at about 1650° C. to effect the formation of silicon carbide.

8. A process as set forth in claim 1 in which said extrudable mixture is essentially composed of a compound of a boride-forming element, a source of boron, a temporary binder, and water.

9. A process as set forth in claim 8 in which said extrudable mixture is essentially composed of zirconium dioxide, boron carbide, carbon, a temporary binder and water, and in which said elongated shape is progressively heated to a temperature in the range from about 1600° C. to about 1800° C. to effect said reaction.

10. A process as set forth in claim 2 in which said extrudable mixture contains zirconium carbide-forming proportions of finely divided zirconium dioxide and finely divided carbon and in which said continuous shape is progressively heated to a temperature in the range from about 1600° C. to about 1800° C. to effect said reaction.

11. A process as set forth in claim 2 in which said extrudable mixture contains titanium carbide-forming proportions of finely divided titanium dioxide and finely divided carbon and in which said continuous shape is progressively heated to a temperature in the range from about 1500° C. to about 1800° C. to effect said reaction.

12. A continuous process for producing silicon carbide which includes the steps of providing an extrudable mixture containing silicon carbide forming proportions of finely divided silicon dioxide and finely divided carbon; continuously extruding said mixture vertically to form a continuous, unreinforced elongated body; moving said continuous body vertically at a constant controlled rate successively through a drying zone in which said continuous body is progressively made self-supporting, a reaction zone in which said continuous body is progressively heated without any separate support and without loss of shape to effect reaction between said silicon dioxide and said carbon to form a continuous silicon carbide body and carbon monoxide, and a cooling zone in which air is passed over said continuous silicon carbide body; collecting said carbon monoxide, admixing said carbon monoxide with the heated air leaving said cooling zone, recycling the gaseous mixture thus obtained to said drying zone and there burning said mixture to provide heat for said drying; and recovering the cooled silicon carbide from said body.

References Cited

UNITED STATES PATENTS

| 1,928,435 | 9/1933 | Powell | 264—57 X |
| 2,178,773 | 11/1939 | Benner et al. | 23—208 |
| 3,019,084 | 1/1962 | Amstein | 23—204 |
| 656,599 | 8/1900 | Doolittle | 23—208 |
| 2,729,542 | 1/1956 | Van der Pyl | 23—208 |
| 2,957,754 | 10/1960 | Nicholson | 23—204 |

FOREIGN PATENTS

| 582,807 | 9/1959 | Canada. |

MILTON WEISSMAN, *Primary Examiner.*

MAURICE A. BRINDISI, OSCAR R. VERTIZ,
*Examiners.*

G. T. OZAKI, *Assistant Examiner.*